United States Patent [19]
Cheong et al.

[11] Patent Number: 5,983,341
[45] Date of Patent: *Nov. 9, 1999

[54] DATA PROCESSING SYSTEM AND METHOD FOR EXTENDING THE TIME FOR EXECUTION OF AN INSTRUCTION

[75] Inventors: Hoichi Cheong; Paul Joseph Jordan; Hung Qui Le, all of Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/840,921

[22] Filed: Apr. 25, 1997

[51] Int. Cl.⁶ .................................. G06F 9/06; G06F 9/22
[52] U.S. Cl. ...................... 712/216; 712/219; 712/201; 712/205
[58] Field of Search .................................. 395/392, 395, 395/377; 712/216, 219, 201, 205

[56] References Cited

U.S. PATENT DOCUMENTS

| | | | |
|---|---|---|---|
| 4,639,886 | 1/1987 | Hashimoto et al. | 364/736.85 |
| 5,185,869 | 2/1993 | Suzuki | 395/581 |
| 5,544,342 | 8/1996 | Dean | 711/119 |
| 5,553,256 | 9/1996 | Fetterman et al. | 395/393 |
| 5,555,432 | 9/1996 | Hinton et al. | 395/800 |
| 5,564,029 | 10/1996 | Ueda et al. | 395/392 |
| 5,603,047 | 2/1997 | Laulk, Jr. | 395/800.23 |
| 5,628,021 | 5/1997 | Iadonato et al. | 395/800 |
| 5,692,209 | 11/1997 | Meaney et al. | 395/800 |
| 5,761,474 | 6/1998 | Lesartre et al. | 395/393 |
| 5,784,588 | 7/1998 | Leung | 395/392 |
| 5,784,639 | 7/1998 | Abramson | 395/800.23 |
| 5,787,266 | 7/1998 | Johnson et al. | 395/392 |
| 5,790,826 | 8/1998 | Thursoo et al. | 395/392 |

*Primary Examiner*—Krisna Lim
*Attorney, Agent, or Firm*—Kelly K. Kordzik; Winstead Sechrest & Minick P.C.; Anthony V. S. England

[57] ABSTRACT

A data processing system indicates that an instruction does not have available data because of a cache miss or because of a non-cache-miss delay. When the instruction is not able to access the available data and a cache miss results, instructions which are dependent on the issued instruction are not issued. However, if the load execution is delayed because of a non-cache-miss delay, then the instructions which are dependent on the issued instruction are also issued in anticipation of a successful load instruction execution in a next timing cycle. Through the use of this issuing mechanism, the efficiency of the data processing system is increased as an execution unit is better able to utilize its pipeline.

27 Claims, 7 Drawing Sheets

DATA PROCESSING SYSTEM AND METHOD FOR EXTENDING THE TIME FOR EXECUTION OF AN INSTRUCTION

TECHNICAL FIELD

The present invention relates in general to data processing systems, and in particular, to instruction scheduling mechanisms in pipelined data processing systems.

BACKGROUND INFORMATION

High performance processors currently used in data processing systems today may be capable of "superscalar" operation and may have "pipelined" elements. A superscalar processor has multiple elements which operate in parallel to process multiple instructions in a single processing cycle. Pipelining involves processing instructions in stages, so that the pipelined stages may process a number of instructions concurrently. In a typical first stage, referred to as a "instruction fetch" stage, an instruction is fetched from memory. Then, in a "dispatch" stage, the instruction is decoded into different control bits, which designate a type of functional unit for performing the operations specified by the instruction, source operands for the operation, and destination registers for results of operations. The decoded instruction is dispatched to an issue queue where instructions wait for data and an available execution unit. Next, in the "issue" stage, an instruction in the issue queue is issued to a unit having an "execution stage." The execution stage processes the operation as specified by the instruction. Executing an operation specified by an instruction includes accepting one or more operands and producing one or more results.

A "completion" stage addresses program order issues which arise from concurrent instruction execution, wherein multiple, concurrently executed instructions may deposit results in a single register. The completion stage also handles issues arising from instructions dispatched after interrupted instruction deposits results in a same destination registers. In the completion stage, an instruction waits for the point at which there is no longer a possibility of an interrupt before storing a data value, so that a depositing of a result will not violate a program order. At this point, the instruction is considered "complete." It should be noted that buffers to store execution results before results are deposited into the destination register and buffers to back up contents at specified checkpoints are provided in the instance an interrupt reverts the register content to its pre-checkpoint value. Either types of buffers may be utilized in a particular implementation. At completion, the results of the execution buffer and the holding buffer will be deposited into the destination register and the back-up buffer will be released.

Pipelined data processing systems typically implement load instructions to load information from a storage location to a register in a pipelined fashion. Typically, such load instructions execute in one cycle and, therefore, do not adversely affect the timing associated with pipelined flow of the data processor. However, under certain conditions, execution of the load instruction will take more than one cycle and, thus, the timing of the pipeline flow will be adversely affected. One of the conditions which may require a load operation to execute in more than one cycle occurs when an address of the load instruction must be translated. Address translation requires a look-up and address compare operation using a translation lookaside buffer (TLB). When an address translation operation involving a TLB is executed by a data processing system, an extra cycle is required for control signals corresponding to the load instruction to access the TLB. If there is a corresponding real address stored in the TLB, then the address translation is considered successful. However, if there is no corresponding entry in the TLB, then a table walk operation is initiated. Such a table walk operation requires all page table entries to be fetched from a memory. The table walk operation consumes a substantial number of cycles during execution of a load operation.

Additionally, a load operation may take more than one cycle when the load instruction is made to an address which is not aligned. An address is not aligned when data for that load instruction spans across the address boundary for which the data processing system is designed. In this case, an additional cycle is required to assemble data that spans the boundary of the fetch address. Unlike a load operation which requires address translation and may take an undetermined number of cycles to execute, an unaligned load operation only requires a fixed number of additional cycles.

During operation of a typical data processor, an instruction issuing algorithm issues instructions with available operands to execution units for execution. If a load executes, but its data is not in the cache, then subsequent instructions which depend on the load instruction are marked as not having available data and are not issued to the execution unit. When data required for a load instruction is not in a cache at the time the load instruction executes, a "cache miss" results. A cache miss operation indicates that the data is not accessible from a cache memory which may be quickly accessed. When a cache miss occurs, the processor is forced to initiate a memory request for the load data. As previously mentioned, this memory request may take several cycles to complete. However, before the cache miss condition is detected, issued logic already marks the instruction which depends on the load operation as "ready" for execution. When the cache miss condition is reported, the issue logic must reset the mark made on the instruction to indicate that the instruction that depends on the load is not ready for execution. A reset operation typically takes several cycles to perform. This reset operation is utilized even when the execution of the load instruction is delayed by a cycle. That is, the issue logic does not distinguish a condition that causes a multiple cycle delay for the data (i.e., a cache miss) from a condition which causes a single cycle delay (i.e., translation buffer access or an unaligned access). By not distinguishing the two conditions, the issue logic forces all instructions that depend on the load that has delayed a cycle to incur the same penalty as a load operation delayed for more than one cycle, due to the reset operation.

Therefore, a need exists for a mechanism in a data processing system which more efficiently utilizes the resources of the data processing system when an instruction is delayed by a minimum number of cycles.

SUMMARY OF THE INVENTION

The previously mentioned needs are fulfilled with the present invention. Accordingly, there is provided, in a first form, a data processing system. The data processing system includes a queue for storing a plurality of instructions and a local execution cluster for executing a first one of the plurality of instructions. The local execution cluster selectively asserts a first control signal to indicate a first extended period of time is required to retrieve a first data value. A state machine is connected to the local execution cluster for providing a second control signal to enable the local execution cluster to maintain a current state for a preselected time period when the first control signal is asserted.

Additionally, there is provided, in a second form, a method for anticipating instruction execution in a data processing system. The method includes the steps of storing of plurality of instructions in queue, executing a first one of the plurality of instructions in a local execution cluster, and selectively asserting a first control signal to indicate a first extended period of time as required to retrieve a first data value in response to execution of the first one of the plurality of instructions. Additionally, the method includes a step for providing a second control signal from a state machine to enable the local execution cluster to maintain a current state for a preselected time period when the first control signal is asserted.

Furthermore, there is provided, in a third form, a program storage device readable by a machine, tangibly embodying a program of instructions executable by the machine to perform method steps for anticipating instruction execution in a data processing system. The method steps include storing a plurality of instructions in a queue, executing a first one of the plurality of instructions in a local execution cluster, and selectively asserting a first control signal to indicate a first extended period of time as required to retrieve a first data value in response to execution of the first one of the plurality of instructions. The method also includes the step of providing a second control signal from a state machine to enable the local execution cluster to maintain a current state for a preselected time period when the first control signal is asserted.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements a data processing system which indicates that an instruction does not have available data because of a cache miss or because of some other reason to an instruction issuing algorithm. When the instruction is not able to access the available data and a cache miss results, instructions which are dependent on the issued load instruction are not issued. However, if the load execution is delayed because of another reason, then the instructions which are dependent on the issued load instruction are also issued in anticipation of a successful load instruction execution in the next cycle. Through the use of this issuing mechanism, the efficiency of the data processing system is increased as an execution unit is better able to utilize its pipeline.

The foregoing description provided a brief overview of operation of the present invention. However, the following description will provide more detailed information regarding the connectivity of the elements of the present invention, as well as a more detailed description of operation of the present invention.

Description of Connectivity

Figure 1:
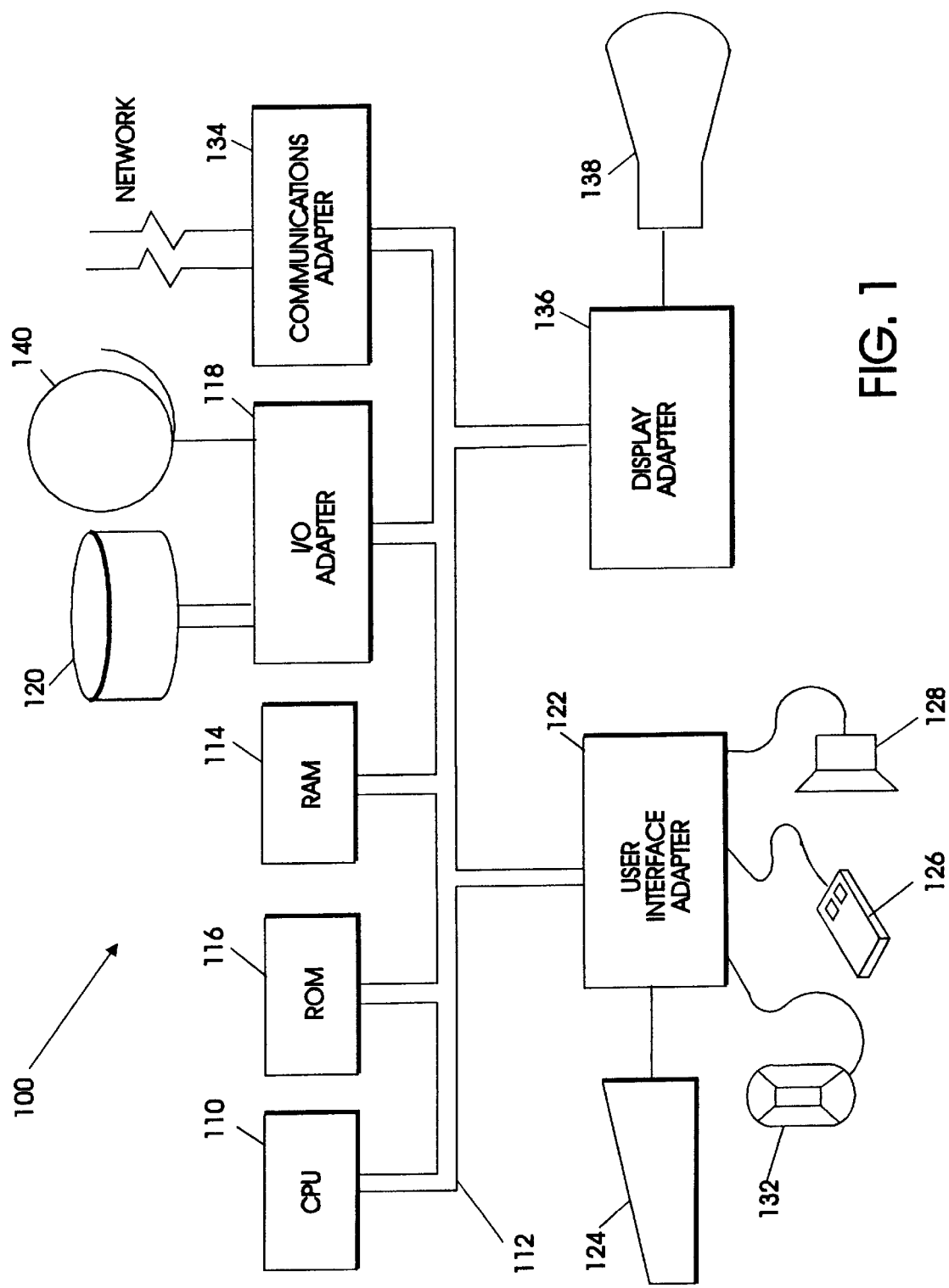
FIG. 1 illustrates, in block diagram form, a data processing system in accordance with one embodiment of the present invention.

One embodiment of the present invention is illustrated in FIG. 1. Referring first to FIG. 1, an example is shown of a data processing system 100 which may be used for the invention. The system has a central processing unit (CPU) 110. The history buffer 228 is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. 1/0 adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
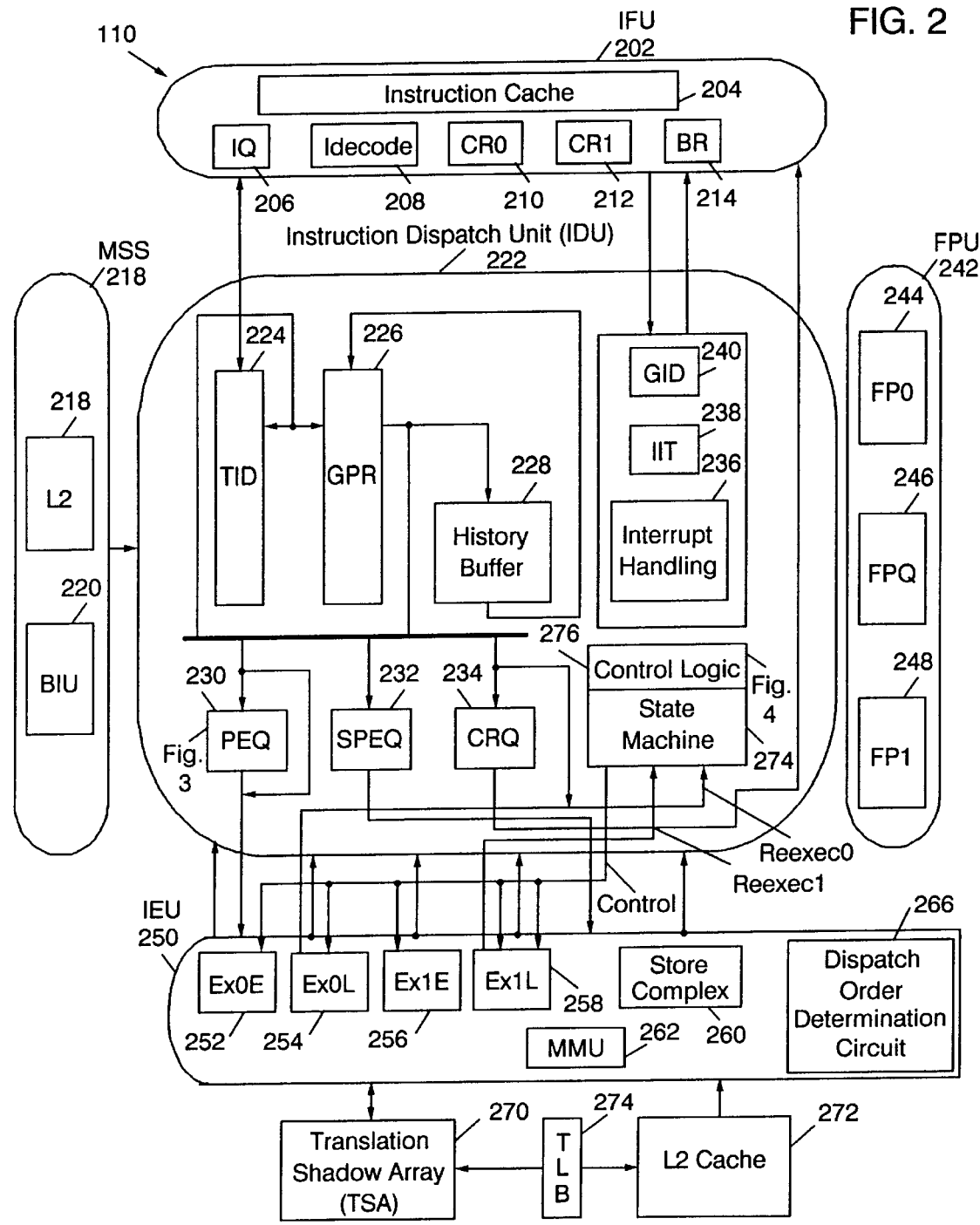
FIG. 2 illustrates, in block diagram form, a CPU in accordance with one embodiment of the present invention.

One embodiment of the present invention is illustrated in FIG. 2. FIG. 2 provides a block diagram of a pipelined CPU 110 in accordance with one embodiment of the present invention. Pipelined CPU 110 comprises an instruction fetch unit (IFU) 202, a memory subsystem (MSS) 216, an instruction dispatch unit (IDU) 222, a floating point unit (FPU) 242, and an instruction execution unit (IEU) 250.

IFU 202 comprises an instruction cache 204, an instruction queue (IQ) 206, an instruction decode (Idecode) circuit 208, a condition register unit 210, and a branch (BR) unit 214. Memory subsystem 216 comprises a second level (L2) cache 218, and a bus interface unit (BIU) 220. Floating point unit 242 comprises a floating point unit 0 (FP0) 244, a floating point queue (FPQ) 246, and a floating point unit 1 (FP1) 248. IEU 250 comprises a plurality of fixed-execution units, Ex0E 252, Ex0L 254, Ex1E 256, and Ex1L 258. It should be noted that each of the execution units labeled Ex0E 252 and Ex1E 256 are referred to as early execution units. Similarly, the execution units labeled Ex0L 254 and Ex1L 258 are referred to as the late execution units. Additionally, IEU 250 comprises a store/complex execution unit 260, a L0 load (data cache) unit 264, and a memory management unit (MMU) 262. IEU 250 is coupled to translation shadow array (TSA) 275 and a translation lookaside buffer (TLB) 274.

IDU 222 comprises a target identification (TID) generation circuit 224, a plurality of general purpose registers (GPR) 226, a history buffer 228, a pre-execution queue (PEQ) unit 230, a store/complex pre-execution queue (SPEQ) unit 232, and a condition register queue (CRQ) 234. Additionally, IDU 222 comprises an interrupt handling mechanism 236, an interruptible instruction table (IIT) circuit 238, and a group identification (GID) circuit 240. It should be noted that PEQ 230, SPEQ 232 and CRQ 234 each comprise some similar features.

The foregoing discussion provides a description of connectivity of the elements utilized in implementing one embodiment of the present invention. A description of operation of each of these elements will subsequently be provided in greater detail. During the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Description of Operation

To clearly point out novel features of the present invention, the following discussion omits or only briefly describes conventional features of information processing systems which are apparent to those skilled in the relevant art. It is assumed that those skilled in the relevant art are familiar with superscalar processors. In particular, it is assumed that those skilled in the art are familiar with processors which operate in an in-order dispatch, out-of-order execution, and in-order completion fashion.

The following discussion describes a pre-execution queue utilized in a pipelined processor and circuitry used to control operation of this queue.

FIG. 1 illustrates an example of a data processing system 100 which may be used to implement one embodiment of the present invention. Data processing system 100 has a CPU 110, which is illustrated in greater detail in FIG. 2. It should be noted that CPU 110 is a pipelined machine. Specifically, CPU 110 comprises various registers, buffers, memories, and other units formed by integrated circuitry. Furthermore, CPU 110 operates according to reduced instruction set computing (RISC) techniques. Additionally, CPU 110 processes instructions according to processor cycles which are synchronized, in some aspects, to an internal clock (not illustrated in detail herein).

During operation, instructions are processed in CPU 110 in a sequence of logical, pipelined stages, as has been previously described. However, it should be well understood that the functions of these stages, as implemented in the preferred embodiment of the present invention, may be merged together. Therefore, this particular division of stages should not be taken as a limitation, unless such a limitation is indicated herein.

Refer now to FIG. 2 for a description of operation of CPU 110. During operation, a memory, such as instruction cache 204 or another memory unit (not illustrated herein) provides instructions to IQ 206 in a "fetch" stage of operation. From IQ 206, instructions are provided to PEQ 230 in a "dispatch" stage of operation. PEQ 230 stores instructions and data to be sent to each of the plurality of execution units, Ex0E 252, Ex0L 254, Ex1E 256, and Ex1L 258. It should be noted that the execution units described herein may be divided into two clusters. A first cluster comprises execution units, Ex0E 252 and Ex0L 254. Furthermore, the second cluster comprises the execution units labeled Ex1E 256 and Ex1L 258. Furthermore, in the first cluster, Ex0E 252 is referred to as an early unit of the first cluster. Additionally, Ex1E 256 is referred to as the early unit of the second cluster. Similarly, Ex0L 254 is referred to as the late unit of the first cluster and Ex1L 258 is referred to as the late unit of the second cluster.

In both the first and second clusters, it should be noted that the early unit in that cluster can forward a result to the late unit in the same cluster to be used in the same cycle. For example, an instruction executing in early execution unit Ex0E 252, in cycle "n" can forward the result to late unit Ex0L 254 in the same cluster, so that a dependent instruction may use that result and execute in late unit Ex0L 254 in the same cycle n. State another way, there is zero cycle forwarding in the implementation of the execution units described herein. Additionally, the late unit in a cluster can forward a result to the early unit in the same cluster so that the result is available for execution in the early unit during the cycle after a result is generated. Stated another way, there is one cycle forwarding within a cluster. For example, an instruction executing in late unit Ex0L 254 in cycle n can forward the result to the early unit Ex0E 252 in the same cluster, so that a dependent instruction can use that result and execute in early execution unit, Ex0E 252, in a timing cycle n+1.

The early unit in a cluster (local cluster) can forward the result to the execution units in another cluster (remote cluster) so that the result is available for execution in the remote cluster during a first cycle after the result is generated. For example, an instruction executing in early execution unit Ex0E 252 of the first cluster in a first timing cycle n, can forward the result to either early unit, Ex1E 256 or late unit Ex1L 258 of the second cluster, so that a dependent instruction can use that result and execute in either of Ex1E 256 or Ex1L 258 in cycle n+1.

Additionally, it should be noted that the late unit in a local cluster can forward the result to the execution units of a remote cluster one cycle after the result is generated. Therefore, there would be two-cycle forwarding between clusters. For example, an instruction executing in late unit Ex0L 254 of the first cluster in cycle n can forward the result to either early unit Ex1E 256 or late unit Ex1L 258 of the second cluster, so that a dependent instruction can use that result and execute in either Ex1E 256 or Ex1L 258 in cycle n+2. It should be noted that all units in both the first and second clusters can forward their result to GPR 226 and PEQ 230 one cycle after the result is generated. Furthermore, it should be noted that a load instruction can execute only in the late unit of a cluster.

For all execution units and the clusters to operate efficiently, PEQ 230 must account for non-uniform forwarding of result data by each of the execution units within and between the clusters when scheduling instructions to be sent to each of the clusters. In addition, PEQ 230 must schedule only instructions of operands which are available. It should be noted, however, that out-of-order issuing is allowed.

PEQ 230 must also provide a fast recovery method for recovering when a speculative execution is scheduled, but aborted. For example, instructions may be scheduled on the assumption that a particular branch instruction will take a certain path, and instead, the branch instruction takes an alternative path. There is also the possibility that an exception will occur between two scheduled instructions. Furthermore, PEQ 230 must only schedule certain instructions, such as load instructions into the late unit of a cluster. Lastly, PEQ 230 must implement the above operations in a simplified manner to meet the cycle time requirements of CPU 110 and data processing system 100.

During instruction queuing and issuing, PEQ 230 acts as a reservation station and holds instructions and their data to be issued to the first and second clusters of execution units. A set of latches implements a priority array (not illustrated herein) to track the relative ages of instructions in PEQ 230.

Figure 3:
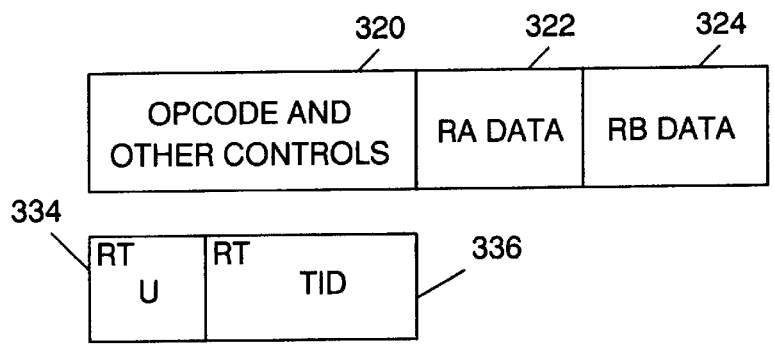
FIG. 3 illustrates, in block diagram form, a location within a pre-execution queue of the present invention.
Figure 4:
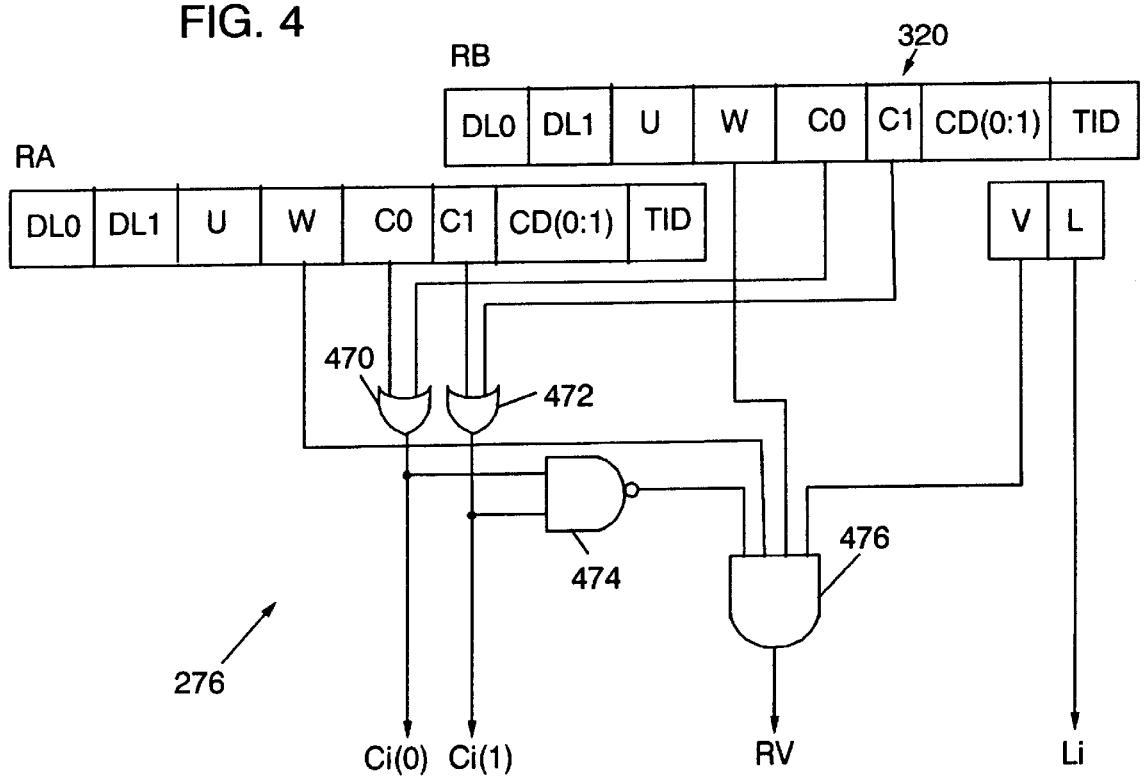
FIG. 4 illustrates, in partial logic diagram form, a control logic circuit in accordance with one embodiment of the present invention.

FIGS. 3 and 4 shows the fields for each entry of PEQ 230. Each entry consists of an opcode and other controls 320, RA data 322, and RB data 324. Bits that are associated with each PEQ entry are as follows:

V: indicates whether entry is valid.
L: indicates whether instruction is a load instruction.
RT (instruction target is GPR):
  U: indicates whether field is valid
  TID: indicates target ID of GPR to which instruction will be sent.
  TID is the pointer to be used for operand interlock. TID also is the instruction identifier.
RA (instruction source is GPR):
  DL0, DL1: indicates whether the RA field to be accessed by the instruction is dependent on load data from cluster 0 or cluster 1, respectively.
  U: indicates whether field is valid
  W: indicates whether RA field is loaded (if RA is not used, this bit is set to 1 at dispatch).
  C0, C1: indicates whether operand is dependent on the instruction being executed in the late unit of the cluster (C0 for cluster zero, bit C1 for cluster one).
  These bits are active for one cycle to steer this instruction to the unit that has the data.
  CD (0:1): C0, C1 bits delayed by a cycle. PEQ uses CD to reset the W bit if data is canceled. These bits are active for one cycle unless they are forced to hold their value for one cycle by state machine 274.
  TID: the target ID of the GPR which will provide the necessary operand.
RB (instruction source is GPR):
  DL0, DL1: indicates whether the RB field to be accessed by the instruction is dependent on load data from cluster 0 or cluster 1, respectively.
  U: indicates whether field is valid.
  W: indicates whether RB field is loaded (if RB is not used, this bit is set to 1 at dispatch).
  C0, C1: indicates that operand is dependent on the instruction being executed in the late unit of the cluster (C0 for cluster zero, C1 for cluster one). These bits are active for one cycle to steer this instruction to the unit that has the data.
  CD(0:1): C0, C1 bits delayed by a cycle. PEQ uses CD to reset W bit if data is canceled. These bits are active for one cycle unless they are forced to hold their value for one cycle by state machine 274.
  TID: target ID of the GPR which will provide the necessary operand.

FIG. 4 also shows the following PEQ instruction state indicators, which are the combinations of individual bits described above to specify the state of each entry in PEQ:

CI(0): indicates that instruction is dependent on the instruction being executed in a late unit 254. This bit is the "OR" of the C0 bits of the two operands.
CI(1): indicates that instruction is dependent on the instruction being executed in the late unit 258. This bit is the "OR" of the C1 bits of the two operands.
RV: indicates that instruction is ready for execution. This bit is the combination of the two operand available bits W queue entry valid bit V, and the two C bits (note that an instruction is not ready if it depends on operands that are being generated in both late units).
LI: indicates that instruction is a load.

During operation, the CI(0) value indicates that the instruction is dependent on the instruction being executed in late execution unit Ex0L 254. Similarly, the CI(1) bit indicates that the instruction is dependent on the instruction being executed in late execution unit Ex1L 258. The RV bit indicates that the instruction is ready for execution. It should be noted that an instruction will not be considered "ready" if the instruction depends on operands that are being generated in both late execution units Ex0L 254 and Ex1L 258. The LI bit indicates that the instruction is a load operation.

By using the aforementioned bits, PEQ 230 is able to designate characteristics about each of the instructions dispatched thereto by IQ 206. It should be noted that when IQ 206 dispatches instructions to PEQ 230, the instructions are dispatched in the order of oldest to newest and the order of all entries in PEQ 230 is marked by a priority array (not illustrated herein). Furthermore, the previously mentioned priority array is set to reflect an age of the instructions relative to other instructions in PEQ 230.

Upon receipt by PEQ 230, an instruction is marked to indicate a variety of characteristics, as described above with respect to the other control data value 320, RA data value 322, and RB data value 324. In one embodiment of the present invention, PEQ 230 marks an instruction which depends on a load by asserting the DL bit. When the load operation or an instruction that depends on a load instruction is issued, the TID of that instruction is compared with all the TIDs of the operands in PEQ 230. The TID of that instruction is provided by RT TID 336 of the issued instruction. It should be noted that the TID (target identifier) is a value which is unique to the instruction and is assigned sequentially with respect to previously assigned TID values in TID generator 224. Therefore, an instruction can be uniquely identified by its TID and a sequence by which the instructions are dispatched can be inferred from a comparison of the TIDs of the instructions. It should be noted that the TID will remain associated with the assigned instruction until the instruction is completed and the TID is retired.

After the TIDs are compared against all TIDs of the operands stored within PEQ 230, if the TIDs match, then the W, C, and DL bits of the matching operand within PEQ 230 is asserted.

When an instruction is issued, a two bit DL field is created. This DL field subsequently "tags" along with the instruction. This field is referred to as the "issue DL" field and is determined in the following manner. If the issuing instruction is a load instruction, then the DL bit 0 is asserted if the load instruction is being issued to cluster 0. The DL bit 1 is asserted if the load instruction is being issued to cluster 1. Furthermore, DL bits of the RA and RB operands are logically OR'ed together bit by bit to form an issue DL field. When the TID of the issuing instruction matches the TID of the RA or RB filed of an entry within PEQ 230, the issue DL field bits are copied into DL0 and DL1 of the RA or RB field of the corresponding PEQ entry. Additionally, in this situation, the corresponding DL bits of the RA and RB operands are asserted from the issue DL field. The issue DL field "tags" along with the instruction so that execution units may examine it to determine if the instruction should be aborted, as the corresponding load data is not available. When a load data associated with the load instruction is not in the first level cache, a cache miss condition has occurred. This cache miss condition is signalled by the execution unit negating a data valid signal for the load instruction. It should be noted that there are two valid signals, one for cluster 0 and one for cluster 1.

When the valid signals from cluster 0 and cluster 1 are negated, all entries in PEQ 230 are examined for operands which have an asserted DL0 bit and a CO0 bit pair or an asserted DL1 bit and a CD1 bit. If the above condition is satisfied, then the corresponding W bit is negated to indicate that data is not available due to a cache miss operation. When the W bit is negated, dependent instructions will be blocked from being issued to an appropriate cluster for execution. When a load is executed and its data is not available, but the data is predicted to be available in a next cycle, a stretched execution operation occurs. Such a stretched execution operation will subsequently be described in greater detail. When execution is stretched, the W bits of the dependent operands are not negated and the C bits are copied from the CD bits to indicate a cluster from which the load data will be available. The W bit remains asserted to indicates that the dependent instruction is available for issuing to an appropriate execution unit as indicated by a corresponding C bit.

It should be noted that the execution units indicate that a data retrieval operation will be "stretched" by asserting a Re-exec signal to state machine 274 of IDU 222. The execution unit Ex0L 254 provides a Re-exec 0 signal to state machine 274 and the execution unit Ex1E 256 provides a Re-exec 1 signal to state machine 274. Each of the execution units asserts a corresponding Re-exec signal when a load instruction is executed and the execution unit determines that the load instruction needs extra cycles to execute. Such extra cycles are required when a load operation is not able to access its required data from translation shadow array (TSA) 275. It should be noted that translation shadow array 275 comprises a table of previous address translations which allows an execution unit to access a real address, without performing a translation operation upon every access. However, when an effective address does not exist in the TSA, a full translation using a translation lookaside buffer (TLB) 274 must be used. To perform this full address translation using TLB 274, an extra cycle is required. Therefore, when TLB 274 is utilized to perform an address translation operation, one extra cycle is required and a corresponding one of the execution units performing the load operation will assert a respective one of the Re-exec signals. Furthermore, it should be noted that there are other conditions for which the execution of a load operation may be stretched for one or more cycles. One example of such a condition is an unaligned load operation.

Examples of handling expected data from stretched execution operations of the present invention are illustrated in each of FIGS. 5–8. In the examples illustrated in FIGS. 5–8, assume that the following sequence is being executed by CPU 110:

1. Load instruction; and
2. I1 (Instruction which depends on the load instruction. The instruction is stored in a first location within PEQ 230, labeled PEQ 1).

Figure 5:
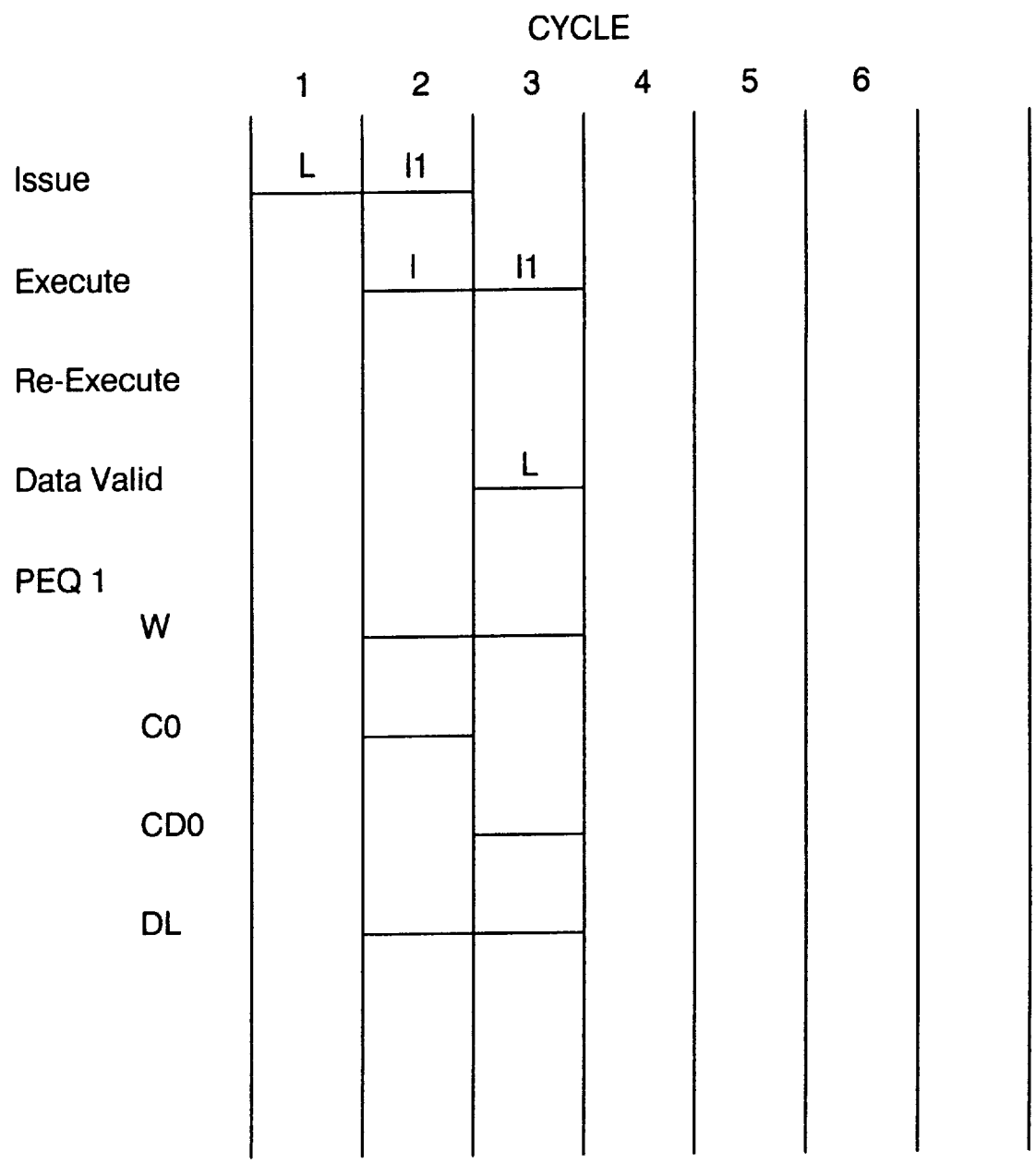
FIG. 5 illustrates, in timing diagram form, a first operation executed by the data processing system of the present invention.

FIG. 5 illustrates a case in which a load operation executes successfully in one cycle. The load is represented by L within FIG. 5. In FIG. 5, the load instruction is issued in cycle 1, executed in cycle 2, and data is available in cycle 3. The availability of data is indicated by the assertion of the Data Valid signal. Furthermore, when the load instruction is issued in cycle 1, the W bit of PEQ1 is asserted in cycle 2 to indicate the data for instruction I1 will be available. When the W bit of PEQ1 is asserted, I1 may be selected or issuing. Furthermore, the C bit in PEQ1 is asserted to indicate that instruction I1 is dependent on the instruction executing in cluster 0.

Furthermore, the DL bit is asserted in PEQ1 of PEQ 230 to indicate that I1 is dependent on a load operation. Furthermore, in cycle 3, the CD 0 bit associated with I1 in PEQ1 is asserted as a result of C0 being asserted in a previous cycle. When CD 0 is asserted, state machine 274 is signalled to check for Load Data Valid signal provided from cluster 0. The Load Data Valid signal is asserted when the CD 0 value is asserted to indicate that the load successfully produces data and a W bit in a first PEQ entry. In this situation, the W bit in the first PEQ entry does not need to be negated.

Figure 6:
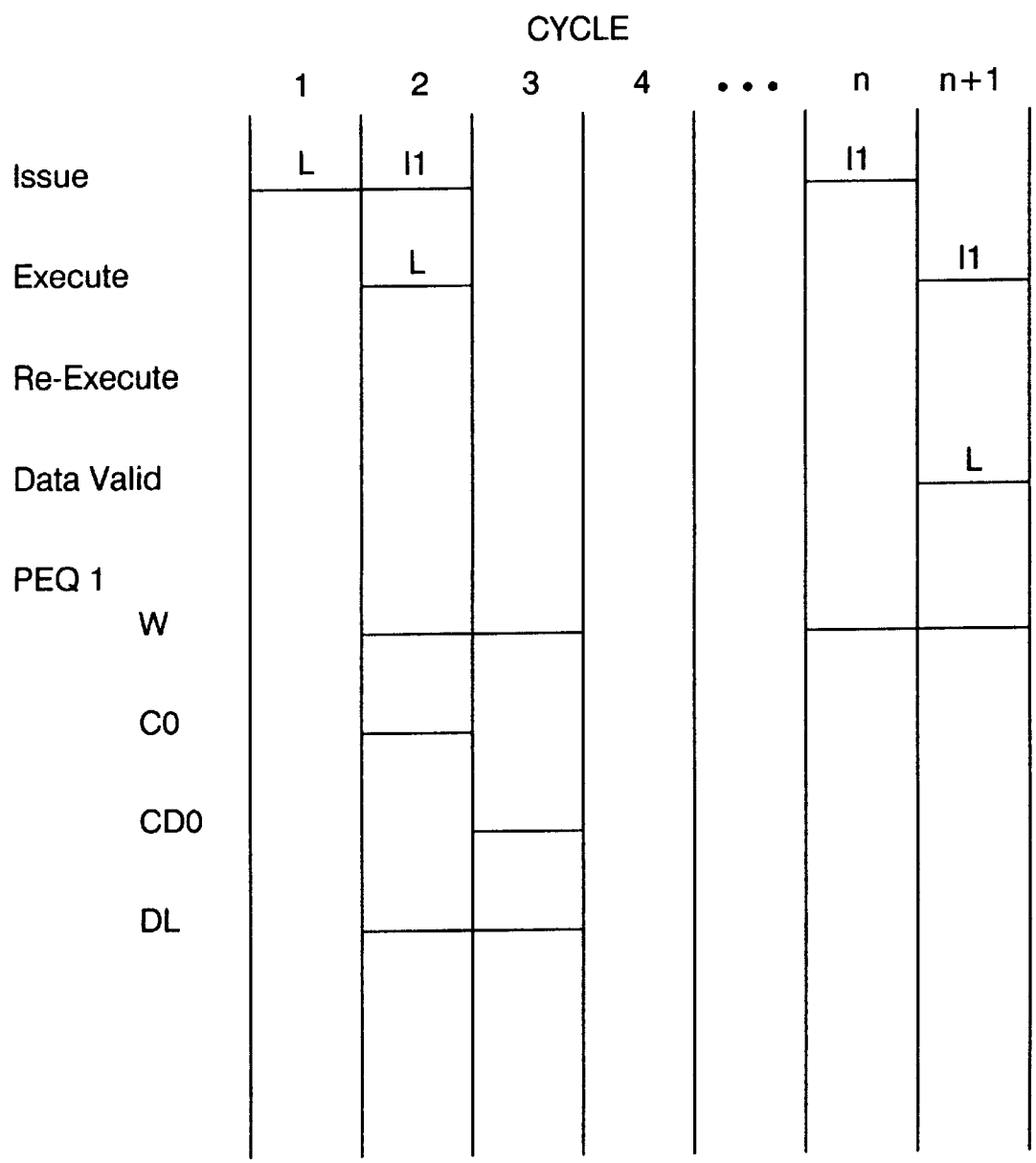
FIG. 6 illustrates, in timing diagram form, a second operation executed by the data processing system in accordance with one embodiment of the present invention.

FIG. 6 illustrates a load operation wherein the load data is not stored in the first level cache and a cache miss occurs. The load instruction is issued in cycle 1, executed in cycle 2, and receives information that data is not available in cycle 3. The I1 instruction is issued in cycle 2, but not executed in cycle 3, because the load data is not available. Subsequently, in cycle 3, the W bit of PEQ 1 is reset, since its CD bit, which indicates that PEQ 1 is waiting for data in the unit that the load executes, is active and the data valid bit is not active. The I1 instruction is reissued in cycle n and executes in cycle n+1 when data comes back from memory.

Figure 7:
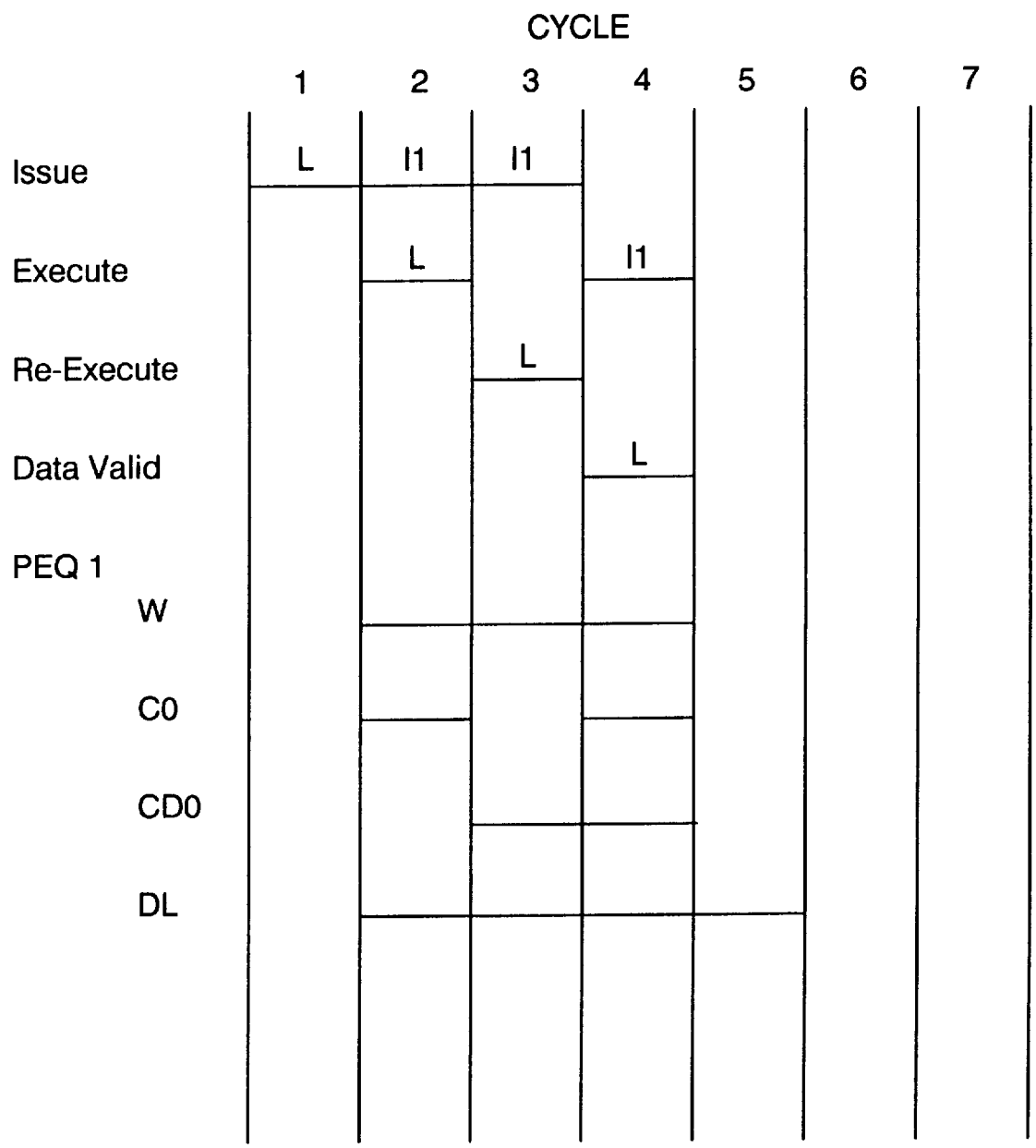
FIG. 7 illustrates, in timing diagram form, a third operation executed by the data processing system in accordance with one embodiment of the present invention.

FIG. 7 illustrates the mechanism of the present invention. In FIG. 7, the load operation requires an extra cycle for performing a full address translation operation using TLB 274. Additionally, it should be noted that other operations require such an extra cycle. In FIG. 7, a load instruction is issued in cycle 1, executed in cycle 2, and data is not available in cycle 3. However, the Re-exec signal is active in cycle 3 to indicate that the execution unit which is executing the load instruction did not encounter a cache miss signal, but does need an extra cycle for execution. In this case, state machine 274 provides control information to PEQ 230, so that PEQ 230 acts as if the operand data is ready and does not negate the W bit in cycle 3. State machine 274 examines the CD bits in PEQ 230. In this example, state machine 274 detects that CD 0 associated with I1 in PEQ 1 is asserted in cycle 3. Subsequently, state machine 274 checks the Load Data Valid signal from cluster 0, which is negated. However, the Re-exec signal from cluster 0 is asserted in cycle 3. Therefore, state machine 274 directs PEQ 230 to:

1. refrain from negating the associated W bit;
2. assert the C0 bit; and
3. prevent the CD 0 value from being negated.

By executing these operations, state machine 274 holds the state of I1 in PEQ 230 to reflect that the data processing system is waiting for confirmation of valid data from the load instruction in cluster 0. PEQ 230 reissues I1 in cycle 3 and I1 executes in cycle 4. Additionally, it should be noted that stretching the execution of a load instruction is not restricted to one cycle. The execution unit can stretch the execution of a load more than one cycle if it is desirable.

Figure 8:
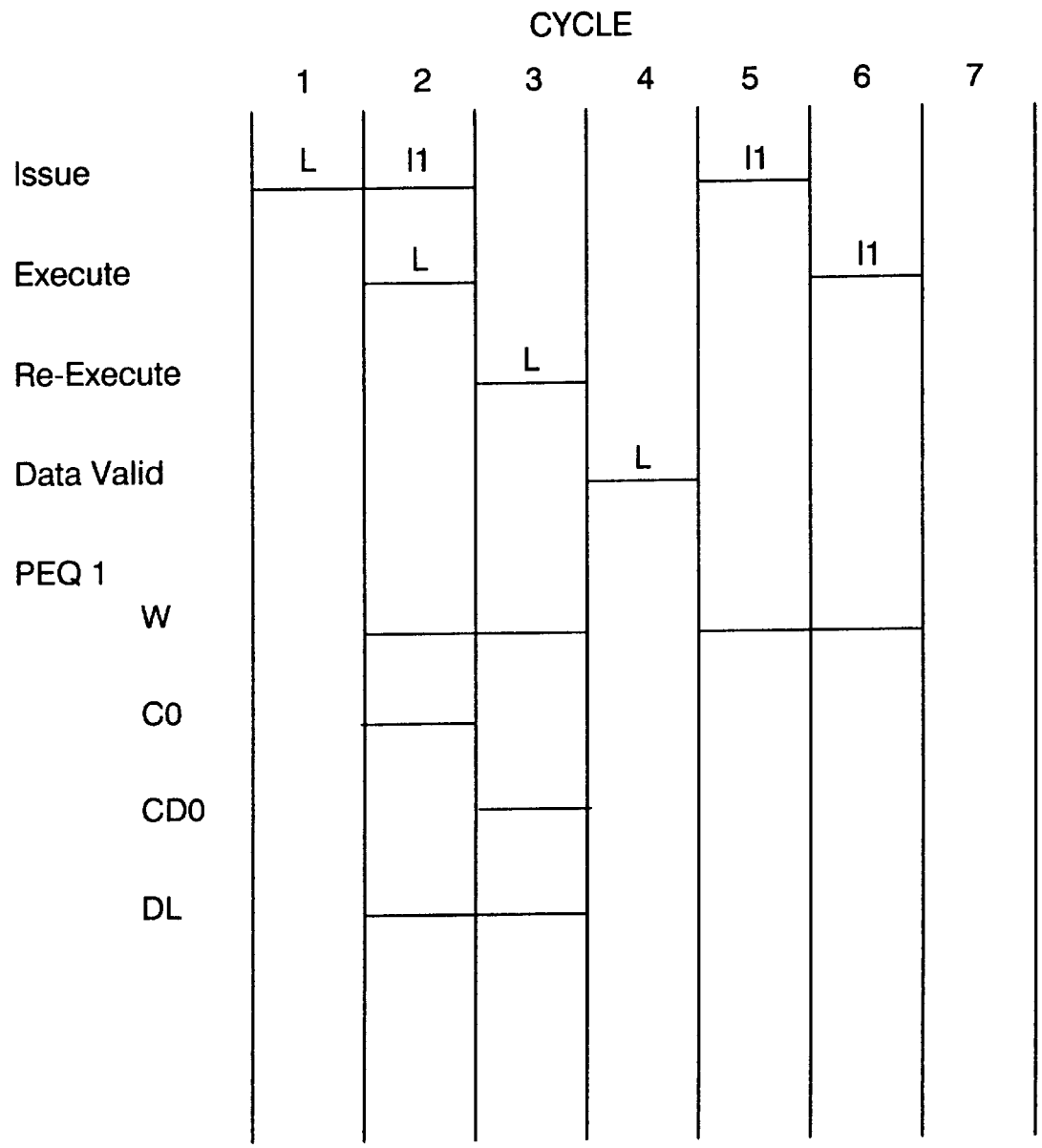
FIG. 8 illustrates, in timing diagram form, an operation executed by a prior art system.

FIG. 8 is provided herein to illustrate a prior art result when a similar operation is executed in a data processing system, which does not have the method or apparatus of the present invention. As illustrated in FIG. 8, a load operation requires an extra timing cycle. In this case, the load instruction is issued in cycle 1, executed in cycle 2, and it is determined the data is not available in cycle 3. An I1 instruction is issued in cycle 2, but not executed in cycle 3, because the load data is not available. In cycle 3, the W bit of PEQ 1 is reset, since its CD bit, which indicates that it is waiting for data in the unit that the load executes, is asserted and the data valid bit is negated. Furthermore, the W bit of PEQ1 is active in cycle 5, as the load executed successfully in cycle 4. The I1 instruction is then issued in cycle 5. It should be noted that this adds two cycles, when compared to the methodology of the present invention. In data processing systems where pipelined processing is used to reduce an amount of time required to execute instructions, a single cycle may have a significant impact on the performance of a data processing system.

As has been described herein, the data processing system and methodology of the present invention improves performance of a pipelined data processing system by recognizing that the probability that a load will execute successfully in a next cycle after a TSA miss operation is very high. Furthermore, the data processing system and methodology of the present invention improves performance of unaligned load operations.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system, comprising:
   a queue for storing a plurality of instructions;
   a local execution cluster for executing a first one of the plurality of instructions, the local execution cluster selectively asserting a first control signal to indicate a first extended period of time is required to retrieve a first data value; and
   circuitry coupled to the local execution cluster for providing a second control signal to enable the local execution cluster to maintain a current state for a preselected time period when the first control signal is asserted.

2. The data processing system of claim 1 wherein the circuitry provides a third control signal to the local execution cluster to enable the local execution cluster to terminate execution of the first one of the plurality of instructions when the first control signal is negated.

3. The data processing system of claim 1, further comprising:
   a translation look-aside buffer for storing a first plurality of data values; and
   a cache memory for storing a second plurality of data values.

4. The data processing system of claim 3 wherein the first control signal is asserted when the first one of the plurality of instructions accesses the translation look-aside buffer.

5. The data processing system of claim 3 wherein the first control signal is negated when the first one of the plurality of instructions accesses the cache memory.

6. The data processing system of claim 1, further comprising:
   a register for storing a write bit to indicate availability of the first data value, wherein the write bit is asserted to indicate that the first data value is available for use in execution of the first one of the plurality of instructions and the write bit is negated to indicate that the first data value is unavailable for use in execution of the first one of the plurality of instructions.

7. The data processing system of claim 6 wherein the circuitry enables the register to maintain the write bit in a current state when the first control signal is asserted.

8. The data processing system of claim 1, further comprising:
   a remote execution unit for executing a second one of the plurality of instructions, wherein the second one of the plurality of instructions is dependent on the first one of the plurality of instructions.

9. The data processing system of claim 8, further comprising:
   a register for storing a dependent bit to indicate when the second one of the plurality of instructions is dependent on the first one of the plurality of instructions.

10. A method for anticipating instruction execution in a data processing system, comprising the steps of:
    storing a plurality of instructions in a queue:
    executing a first one of the plurality of instructions in a local execution cluster;
    selectively asserting a first control signal to indicate a first extended period of time is required to retrieve a first data value in response to execution of the first one of the plurality of instructions; and
    providing a second control signal to enable the local execution cluster to maintain a current state for a preselected time period when the first control signal is asserted.

11. The method of claim 10, further comprising the step of:
    providing a third control signal to the local execution cluster to enable the local execution cluster to terminate execution of the first one of the plurality of instructions when the first control signal is negated.

12. The method of claim 10, further comprising the steps of:

storing a first plurality of data values in a translation look-aside buffer; and storing a second plurality of data values in a cache memory.

13. The method of claim 12, further comprising the step of:

asserting the first control signal when the first one of the plurality of instructions accesses the translation look-aside buffer.

14. The method of claim 10, further comprising the step of:

negating the first control signal when the first one of the plurality of instructions accesses the cache memory.

15. The method of claim 10, further comprising the steps of:

storing a write bit in a register to indicate availability of the first data value;

asserting the write bit to indicate that the first data value is available for use in execution of the first one of the plurality of instructions; and resetting the write bit to indicate that the first data value is unavailable for use in execution of the first one of the plurality of instructions.

16. The method of claim 15, further comprising the step of:

enabling the register to maintain the write bit in a current state when the first control signal is asserted.

17. The method of claim 10, further comprising the step of:

executing a second one of the plurality of instructions in a remote execution unit, wherein the second one of the plurality of instructions is dependent on the first one of the plurality of instructions.

18. The method of claim 17, further comprising the step of:

storing a dependent bit in a register to indicate when the second one of the plurality of instructions is dependent on the first one of the plurality of instructions.

19. A program storage device readable by a machine, tangibly embodying a program of instructions executable by the machine to perform method steps for anticipating instruction execution in a data processing system, said method steps comprising:

storing a plurality of instructions in a queue;

executing a first one of the plurality of instructions in a local execution cluster;

selectively asserting a first control signal to indicate a first extended period of time is required to retrieve a first data value in response to execution of the first one of the plurality of instructions; and providing a second control signal to enable the local execution cluster to maintain a current state for a preselected time period when the first control signal is asserted.

20. The method steps of claim 19, further comprising the step of:

providing a third control signal to the local execution cluster to enable the local execution cluster to terminate execution of the first one of the plurality of instructions when the first control signal is negated.

21. The method steps of claim 19, further comprising the steps of:

storing a first plurality of data values in a translation look-aside buffer; and storing a second plurality of data values in a cache memory.

22. The method steps of claim 21, further comprising the step of:

asserting the first control signal when the first one of the plurality of instructions accesses the translation look-aside buffer.

23. The method steps of claim 19, further comprising the step of:

negating the first control signal when the first one of the plurality of instructions accesses the cache memory.

24. The method steps of claim 19, further comprising the steps of:

storing a write bit in a register to indicate availability of the first data value;

asserting the write bit to indicate that the first data value is available for use in execution of the first one of the plurality of instructions; and resetting the write bit to indicate that the first data value is unavailable for use in execution of the first one of the plurality of instructions.

25. The method steps of claim 24, further comprising the step of:

enabling the register to maintain the write bit in a current state when the first control signal is asserted.

26. The method steps of claim 19, further comprising the step of:

executing a second one of the plurality of instructions in a remote execution unit, wherein the second one of the plurality of instructions is dependent on the first one of the plurality of instructions.

27. The method steps of claim 26, further comprising the step of:

storing a dependent bit in a register to indicate when the second one of the plurality of instructions is dependent on the first one of the plurality of instructions.

* * * * *